United States Patent [19]
Pasquali et al.

[11] Patent Number: 5,450,516
[45] Date of Patent: Sep. 12, 1995

[54] HOLLOW FIBER BUNDLE AND A METHOD AND DEVICE FOR ITS MANUFACTURE

[75] Inventors: Renato Pasquali; Manfred Martin, both of Wuppertal; Peter Riesop, Hattingen, all of Germany

[73] Assignee: Akzo Nobel N.V., Arnhem, Netherlands

[21] Appl. No.: 307,760

[22] PCT Filed: Mar. 23, 1993

[86] PCT No.: PCT/EP93/00693

§ 371 Date: Sep. 27, 1994

§ 102(e) Date: Sep. 27, 1994

[87] PCT Pub. No.: WO93/19839

PCT Pub. Date: Oct. 14, 1993

[30] Foreign Application Priority Data

Mar. 27, 1992 [DE] Germany ......................... 42 10 154.9
Sep. 14, 1992 [DE] Germany ......................... 42 30 696.5

[51] Int. Cl.⁶ .............................................. G02B 6/06
[52] U.S. Cl. ................................... 385/115; 385/125
[58] Field of Search ............... 385/115, 125, 901, 121; 362/32

[56] References Cited

U.S. PATENT DOCUMENTS

| | | | |
|---|---|---|---|
| 3,430,057 | 2/1969 | Genahr | 385/115 |
| 3,557,962 | 1/1971 | Kohl | 210/321.88 |
| 4,077,578 | 3/1978 | Cromie et al. | 242/18 G |
| 4,084,758 | 4/1978 | Cromie | 242/18 G |
| 4,185,888 | 1/1980 | Quelle, Jr. | 385/115 |
| 4,346,006 | 8/1982 | Kopp et al. | 210/321.62 |
| 4,430,219 | 2/1984 | Kuzumoto et al. | 210/321.88 |
| 4,950,391 | 8/1990 | Weickhardt | 210/321.8 |
| 5,126,053 | 6/1992 | Schneider et al. | 210/640 |
| 5,129,028 | 7/1992 | Soltan | 385/115 |

FOREIGN PATENT DOCUMENTS

| | | |
|---|---|---|
| 2362793 | 6/1975 | Germany . |
| 2825065 | 12/1979 | Germany . |
| 3301268A1 | 7/1984 | Germany . |
| 2-162302 | 6/1990 | Japan ......... 385/125 |
| 1415975 | 12/1975 | United Kingdom . |
| 2012187 | 7/1979 | United Kingdom . |

Primary Examiner—Rodney B. Bovernick
Assistant Examiner—John Ngo
Attorney, Agent, or Firm—Oliff & Berridge

[57] ABSTRACT

Hollow fiber bundle of hollow fibers arranged in layers on top of one another and fiber layers arranged between the hollow fiber layers, in which, in a top view looking down on the hollow fiber bundle, the hollow fibers are formed so that they are undulating or essentially rectilinear and the fibers are undulating, and so formed and-/or arranged that the hollow fibers and the fibers intersect at several locations.

19 Claims, 5 Drawing Sheets

HOLLOW FIBER BUNDLE AND A METHOD AND DEVICE FOR ITS MANUFACTURE

FIELD OF THE INVENTION

The invention relates to a hollow fiber bundle composed of hollow fibers arranged in layers on top of one another and of fiber layers located between the hollow fiber layers, in which, as seen in a top view of the hollow fiber bundle, the hollow fibers are made undulating or essentially rectilinear and the fibers, which have a smaller diameter than the hollow fibers, are made undulating, and the fibers are so designed and/or arranged that the hollow fibers and the fibers intersect at several locations and are laid one on top of the other, and are not woven, knit, or otherwise joined.

BACKGROUND

Hollow fiber bundles composed of intersecting hollow fibers extending essentially in the lengthwise direction of the hollow fiber bundle are sufficiently known (U.S. Pat. No. 4,346,006). Depending on the nature of the hollow fibers employed, they are used to transfer heat and/or material in the technical area, for example for reverse osmosis, ultra- or microfiltration, pervaporation, membrane distillation, etc., and also especially in the medical area, in which application they are used especially for treating blood, for example in dialysis, blood oxygenation, plasma separation, plasmapheresis, hemofiltration, blood heat exchangers, etc. The hollow fiber bundle according to the invention can also be used for all of these applications.

SUMMARY OF THE INVENTION

In contrast to known hollow fiber bundles, the hollow fiber bundle according to the invention represents a considerable improvement because of the fiber layers disposed between the hollow fiber layers, since this produces much higher heat transfer and/or material transfer or material exchange capability with the same quantity of hollow fibers. Even when the number of all the fiber cross-sectional areas for example amounts to only 1% of all the hollow fiber cross sectional areas in a hollow fiber bundle according to the invention, the increase in performance as compared with a hollow fiber bundle without fiber intermediate layers can be 10% to 30% for example. Thus for example when cellulose acetate hollow fibers are used in a dialyzer, its performance can sometimes be increased far above 20%, which is therefore far above the performance of all previously-known comparable dialyzers.

Since the manufacture of the hollow fiber bundle according to the invention involves a technically simple procedure, and in particular permits the processing of freshly spun hollow fibers in an on-line process, less expensive hollow fiber bundles can be provided by the invention as well.

The hollow fibers suitable for the hollow fiber bundle according to the invention, also frequently referred to as hollow threads, capillaries, tubules, thin-walled tubes, or the like, can have a porous, especially microporous, or nonporous wall; they are then referred to as porous, microporous, or nonporous hollow fibers. Hollow fibers whose walls are completely or partially permeable to materials, in other words are permeable or semipermeable, and which consequently are suitable for material exchange, material separation, or material transfer, are also frequently referred to as capillary membranes. Such hollow fibers are known. This is also true of the advantageous measurements of the internal and external diameter and the wall thickness of the hollow fibers, and also for suitable materials, of which the hollow fibers consist, such as polymers or cellulose materials. The outside diameter of the hollow fibers lies in the following ranges for example: for dialysis, from 150 $\mu$m to 280 $\mu$m; for oxygenation, from 150 $\mu$m to 500 $\mu$m; for plasmapheresis, from 150 $\mu$m to 650 $\mu$m. The hollow fibers suitable for the hollow fiber bundles according to the invention can be provided on the outer and/or inner surfaces and/or possibly in the pores of their walls for example with immobilized bioactive substances, cells, proteins, or the like. They can also have other adsorptive properties. Hollow fibers with a wall that is essentially impermeable to materials are frequently used for heat transfer, such as in heat exchangers.

Material transfer in the sense of the present invention also comprises material exchange, in which for example a material transfer from a gaseous or liquid medium to a liquid or gaseous medium and vice versa takes place simultaneously.

As fibers for the fiber layers located between the hollow fiber layers, although hollow fibers can be used, preferably multifilament fibers or monofils, in other words full fibers, are used. Textured fibers can also be used as such fibers.

Other terms for "undulating" include zig-zag, serpentine, meander-shaped, or the like.

The hollow fibers can be undulated and for this purpose can be subjected immediately previously to a waving process, like that known for example from DE-OS 33 01 268.

The ratio of the number of hollow fibers to the total number of fibers can be in the range of 1:0.1 to 1:5, but is preferably 1:1. The diameter of the fibers is smaller, especially much smaller, than the diameter or a comparable dimension of the hollow fibers. Much smaller means for example that the diameter of the fibers is only 1/10 of the diameter of the hollow fibers. Then the cross-sectional area of the fibers is only 1/100 of the cross-sectional area of the hollow fibers. Thus for example the total diameter of a multifil polyester fiber can be 70 to 100 $\mu$m (one individual filament = approximately 20 $\mu$m).

The hollow fiber bundle according to the invention with undulating hollow fibers can be manufactured according to the invention by simultaneously winding at least one hollow fiber and at least one fiber onto a rotating drum to form at least one lap; prior to being wound onto the drum, the hollow fiber(s) is/are guided over (at least) one first reciprocating (traversing) fiber guide device and the fiber(s) is/are guided over (at least) one second reciprocating (traversing) fiber guide device, with the first fiber guide device(s) being moved back and forth in the direction respectively opposed (opposite) to the second fiber guide device(s), or the second fiber guide device(s) is/are moved back and forth at a higher speed than the first fiber guide device(s), after the winding-on of the desired quantity of hollow fibers, winding is terminated and the lap(s) formed on the drum is (are) cut at at least one point before or after removal from the drum, essentially transversely to the lengthwise direction of the hollow fibers.

The term "drum" refers here in particular to a round drum, in other words a drum with a round cross section.

However, the drum can also have a polygonal cross section, for example a hexagonal, octagonal, etc. cross section. The advantage of a round drum consists among other things in that no pressure rollers or other retaining means for holding or securing the uppermost fiber layers are required in the vicinity of the fiber guide devices, as may be necessary in a drum that is not round. However, the drum can also be an endless belt, (strip) guided and circulating over at least two rollers. Thus the belt for example can be guided over six rollers forming a hexagon or eight rollers forming an octagon, etc. The fiber guide devices are then preferably located in an area in which the belt is deflected around a roller, in other words is curved. Then no retaining means as described in detail above are required.

In designing the method according to the invention, the hollow fibers and fibers can also be applied only briefly to a portion of the circumference of the drum and immediately thereafter, while retaining the arrangement and the undulating design of the hollow fibers and fibers, can be picked up by, and then wound up on, a second rotating drum, in the sense of the definition of "drum" provided above. In particular, the second drum can essentially correspond to a reel that permits a simpler division of the hollow fiber lap into a corresponding number of hollow fiber bundles. In addition, a device can advantageously be used as the second drum that is similar to the device described in DE-OS 33 01 268 (FIGS. 33 and 34), in which the rotating arm (27) used therein with fiber guide device (1) is omitted and the hexagonal drum formed by endless roller chains (25), etc. (2; 26) is made rotatable around its lengthwise axis. The arrangement of the lengthwise axis, in other words the rotational axis of the second drum, may be horizontal, vertical, or inclined.

If two or more hollow fibers and/or fibers are used to make the hollow fiber bundle according to the invention with undulating hollow fibers, to these, each of the two types separately, is preferably wound up by each using a comb-shaped reciprocating fiber guide device at lateral intervals from one another, essentially equidistant. It is also possible however to wind a plurality of hollow fibers and/or fibers divided into several groups simultaneously on top of one another and for this purpose, to use a comb-shaped reciprocating fiber guide device for each hollow fiber group and each fiber group, with these devices being arranged distributed above one another or on a stretch that is equidistant from the surface of the drum. The fiber guide devices for the hollow fibers can be arranged in such fashion or moved back and forth in such fashion that the hollow fiber groups supplied by them to the drum are essentially wound on top of one another, or in such fashion that they are wound up offset with respect to one another. The same also applies to the comb-shaped fiber guide devices for the fiber groups that are moved back and forth. Such operating mode offers itself if for example 100 hollow fibers and 100 fibers simultaneously should be wound up into a relatively narrow bundle, for example with ten groups of ten hollow fibers each and ten groups with ten fibers each being simultaneously wound up alternating on one another. In any event however it is also true in this connection that the fiber guide devices for the hollow fibers are moved back and forth in the opposite direction, i.e. in the opposed direction from the fiber guide devices for the fibers, or the fiber guide devices for the fibers are moved back and forth at a greater speed than the fiber guide devices for the hollow fibers, in order to achieve the desired crossing.

Hollow fibers and fibers can be made of the same material, but also of different materials. If the fibers consist of the same material as the hollow fibers, it is possible to produce them on the same spinning machine, by using appropriate spinnerets, on which the hollow fibers are also made. With a greater length requirement for the fibers, which is the case when the traversing speed of the fiber guide device for the fibers is greater than the traversing speed for the hollow fibers, the greater fiber length can be achieved by stretching the fibers before winding them up.

In addition, it is also possible to combine different hollow fibers into a hollow fiber bundle by winding them simultaneously. It is also possible to produce several hollow fiber bundles simultaneously side by side on a drum.

The length of the path of the reciprocating fiber guide device for the hollow fibers and the length of the path of the reciprocating fiber guide device for the fibers, the so-called stroke length, can be the same or slightly different, if this should prove advantageous. For example with a longer stroke length for the fibers, it is possible to allow the fiber loops formed at the reversal points to project slightly from the hollow fiber bundle.

As indicated by the above, and the fibers are not woven, knit, or joined in any other way with the hollow fibers, but are merely laid down on the hollow fiber layers previously formed on the winding drum and covered by the next layer of hollow fibers, in other words wound up alternately on top of one another (over one another). This has the result that the fibers or hollow fibers can also be pulled out individually, laterally, out of the hollow fiber bundle, so that to this extent there is an important difference with respect to other known hollow fiber bundles of this kind and this circumstance indicates the manufacturing method.

The lap formed on the drum composed of hollow fibers and fibers as a rule does not have a round cross section. Following separation of the lap and the alignment of the cut lap in the lengthwise direction of the hollow fibers, for example by laying the cut lap on a flat support, the hollow fiber bundle formed in this manner can be shaped into a bundle with a round cross section, for example by the winding device described in DE-OS 33 01 268, without the ordered arrangement of the hollow fibers achieved by winding being lost. This is all the more surprising since, as described above, the hollow fibers and the fibers are not joined to one another. Apparently the fibers prevent the hollow fibers from slipping, so that the laterally equidistant arrangement of the hollow fibers, once achieved, is retained.

The device according to the invention for manufacturing the hollow fiber bundle according to the invention with undulating hollow fibers consists of a rotating drum (winding drum) for simultaneously winding at least one hollow fiber and at least one fiber and has at least one reciprocating (traversing) fiber guide device for feeding the hollow fiber or hollow fibers onto the drum and at least one reciprocating (traversing) fiber guide device for feeding the fiber or fibers onto the drum, with the fiber guide device or devices for the hollow fiber or hollow fibers being moved back and forth in respectively opposite directions, therefore in a contrary manner, to the fiber guide device (fiber guide devices) for the fiber or fibers, or the fiber guide device or devices for the fiber or fibers is/are moved back and forth at a higher speed than the fiber guide device or devices for the hollow fiber or hollow fibers.

The number of traversing movements of the fiber guide devices, in other words the number of double strokes, per unit time, is advantageously adjusted to the rotational speed of the drum in such fashion that in the circumferential direction of the drum, uniform winding with hollow fibers and fibers is achieved, and that therefore successive layers, viewed in a circumferential direction, are arranged slightly offset with respect to one another.

The winding drum is driven in the on-line method with gradually decreasing rotational speed, so that a circumferential speed that remains constant is achieved on the circumference of the winding. The traversing speed of the fiber guide devices can be adjusted to this changing traversing rotational speed of the winding drum or can be kept constant, depending on whether a precision or wild lap is to be produced. In order to avoid a pattern frequently called a mirror in the lap, the drive for the fiber guide devices is provided with a disturbing device, also known as a mirror disturbance.

Now, as an example, several numerical values for a hollow fiber bundle with undulating hollow fibers will be presented, which explain the invention in greater detail, but are not intended to limit it in any way. In one case, 40 hollow fibers and 40 fibers, divided into five groups each of eight hollow fibers and eight fibers were wound on a drum with a diameter of 120 cm at a circumferential speed equal to the winding speed of 52 m/min into a lap 80 mm wide, which then was broken up into several shorter hollow fiber bundles by cutting, said bundles then being shaped into hollow fiber bundles with an essentially round cross section. Hollow fibers which can be processed with no difficulty according to the method of the invention to form a hollow fiber bundle according to the invention with undulating hollow fibers, can have an outside diameter in the range from 150 to 400 $\mu$m. The fibers were filament fibers with a total diameter of approximately 21 $\mu$m and consisted of 14 individual filaments. In another case, five hollow fibers and five fibers were each fed by a reciprocating comb-shaped fiber guide device onto the winding drum and wound up, equidistant laterally, on the drum to form a lap. The speed of the fiber guide device for the hollow fibers was then less than one double stroke per revolution of the drum, while the speed of the fiber guide device for the fibers was approximately eight double strokes per revolution of the drum. The wavelength of the hollow fiber layers was therefore more than eight times larger than the wavelength of the fiber layers. The traversing width of the two fiber guide devices on the other hand was the same so that the hollow fiber layers and the fiber layers had the same wave amplitude.

The hollow fiber bundle according to the invention, with essentially rectilinear hollow fibers, can be manufactured according to the invention by at least two hollow fiber sheets composed of hollow fibers advanced parallel to one another, each in a common plane in the hollow fiber lengthwise direction, at different angles, in other words from different directions, and slightly staggered laterally with respect to one another, being fed to a common reversing device and immediately before the hollow fibers run onto the reversing device at least one fiber is inserted (laid) into the hollow fiber shed formed with a reciprocating (traversing) fiber guide device, in such fashion that each hollow fiber is always recurrently intersected by at least one fiber at preferably regular intervals.

Preferably, exactly the same number of fibers is inserted as hollow fibers are available, and a fiber crosses only one, two, or three hollow fibers, in other words the first fiber crosses the first hollow fiber or the first and second hollow fiber or the first, second, and third hollow fiber, the second fiber crosses the second hollow fiber or the second and third hollow fiber or the second, third, and fourth hollow fiber, etc. In this manner, a short stroke length can be set for the fiber guide device for laying the fibers. However, less or more fibers can be inserted than hollow fibers are available if desired.

The term "hollow fiber shed" used above refers to the place which is called a "shed" in weaving, and is defined as the space that results between the lifting and/or lowering of the warp and serves for inserting the weft for example in a shuttle.

In contrast to shed formation in weaving, however, here the hollow fiber shed is not formed by alternate raising and/or lowering of the even-numbered and/or odd-numbered hollow fibers but by feeding the hollow fiber sheets at different angles to the common reversing direction, in other words from different directions, towards one another. Therefore, in contrast to weaving, constantly repeated brief closing of the shed before the next shed is formed does not take place, but the hollow fiber shed always remains open. Therefore the fiber guide device does not have to be moved out of the hollow fiber shed (like the weft-inserting device, for example the shuttle of a loom), but it can be moved back and forth constantly between two hollow fiber sheets, in other words, it can remain in the hollow fiber shed and be moved back and forth therein.

In designing this method, the hollow fibers and fibers can then be wound onto a rotating or nonrotating drum or the like, retaining their arrangement. With considerable advantage, the device described in DE-OS 33 01 268 (FIGS. 33 and 34) can be used for the purpose.

Preferably, the sheets can each be formed individually by using a comb-shaped fiber guide device or a device with fiber guide eyes arranged in one or more rows. It is also possible to process a plurality of hollow fiber and fiber sheets simultaneously and for this purpose, to use for each hollow fiber sheet and each fiber sheet a comb-shaped fiber guide device or one fitted with eyes.

After insertion of the fibers, the strip-shaped hollow fiber/fiber structure can be shaped into a hollow fiber bundle with an essentially round cross section, for example by passing it through an annular guide device. Specifically, it has been found completely unexpectedly, and must be considered as quite remarkable, that even with such a reshaping into a hollow fiber bundle, the hollow fibers and the inserted fibers are not displaced relative to one another. This means that after reshaping, the hollow fiber bundles can be reshaped back into the original strip-shaped hollow fiber/fiber structures, without there after, if ever, any significant displacement of the inserted fibers being detectable.

In addition, hollow fibers and fibers can consist of the same material, but can also consist of different materials. If the fibers consist of the same material as the hollow fibers, it is possible to make them by using appropriate spinnerets on the same spinning machine on which the hollow fibers are produced. The greater length required for the fibers can be achieved by stretching the fibers before they are inserted.

It is also possible to combine different hollow fibers into a hollow fiber bundle. It is also possible to produce several hollow fiber bundles simultaneously side by side.

The length of the path of the reciprocating fiber guide device for the fibers can be chosen such that the fiber loops formed at the reversal points project slightly out of the hollow fiber bundle.

As stated above, the fibers are not woven, knit, or otherwise joined to the hollow fibers but are merely inserted between two hollow fiber sheets. The hollow fiber bundle according to the invention is therefore structured sandwich fashion, in other words the following are laid down sequentially: a hollow fiber layer, a fiber layer, a hollow fiber layer, etc.; they are not joined together, but touch one another at the intersections. As a result, the fibers or hollow fibers can also be pulled out laterally individually from the hollow fiber bundle, so that to this extent there is a considerable difference with respect to other known hollow fiber bundles of this kind, and this circumstance makes it possible to determine the manufacturing method.

In addition, the bundle formed in this manner from hollow fibers and fibers with essentially rectilinear hollow fibers as a rule does not have a round cross section at the outset. The initially strip-shaped hollow fiber bundle however can be shaped into a bundle with a round cross section, for example by the winding device described in DE-OS 33 01 268, without the ordered arrangement of the fibers achieved previously being lost.

The device according to the invention for producing the hollow fiber bundle of the invention with hollow fibers essentially arranged rectilinearly consists of at least one rod-shaped reversing device, preferably a rotatable or driven roller, for reversing the hollow fiber bundle after insertion of the fiber or fibers, two rod-shaped guide devices, preferably two rotatable or driven rollers, for guiding two hollow fiber sheets so arranged that the hollow fiber sheets are fed at different angles to the reversing device, so that the hollow fiber sheets form a hollow fiber shed before the reversing device, a fiber guide device (traversing device) which can be moved back and forth (traversing) in the hollow fiber shed for undulating, zig-zag, or similar insertion of a fiber or several fibers between the hollow fiber sheets, and a guide device for feeding the fiber or fibers to the reciprocating fiber guide device.

In one embodiment of the device, the guide devices for the hollow fiber sheets can also be arranged in such fashion that they result in the fanning out of a hollow fiber sheet into two or more hollow fiber sheets. Thus for example the even-numbered hollow fibers of the hollow fiber sheet can be guided over one guide device and odd-numbered hollow fibers can be guided over the other guide device, so that in this manner two hollow fiber sheets each with half the number of hollow fibers are formed which, after insertion of the fiber or fibers, are then combined again into a hollow fiber bundle.

In the following, as an example, several numerical values will be mentioned for a hollow fiber bundle with essentially rectilinear hollow fibers, which explain the invention in greater detail but are not intended to limit it in any way. In one case, 40 hollow fibers and 40 fibers were processed into an endless hollow fiber bundle, which was then divided into a plurality of shorter hollow fiber bundles by cutting, said bundles then being shaped into hollow fiber bundles with an essentially round cross section. Hollow fibers that can be processed by the method according to the invention into a hollow fiber bundle with no difficulty, had an outside diameter in the range from 150 to 400 μm. The fibers were filament fibers with a total diameter of approximately 21 μm and consisted of 14 individual filaments.

The method and device disclosed here with a rotating drum is not limited to the production of hollow fiber bundles with undulating hollow fibers and undulating fibers. It is quite possible to use this method and this device also for manufacturing hollow fiber bundles with essentially rectilinear hollow fibers, with the hollow fibers being laid down without traversing on the drum and only the fibers being traversed. In addition, the method and the device for manufacturing the hollow fiber bundles with essentially rectilinear hollow fibers is not limited to such an arrangement of the hollow fibers. It is also possible to use it to produce bundles in which the hollow fibers are made undulating, whereby for example the individual hollow fiber sheets are traversed or the sandwich-formed hollow fiber bundles with essentially rectilinear hollow fibers are fed to a traversing drum.

BRIEF DESCRIPTION OF DRAWINGS

The invention will now be described in greater detail with reference to the drawings. In a simplified schematic representation.

DETAILED DESCRIPTION OF PREFERRED EMBODIMENTS

Figure 1:
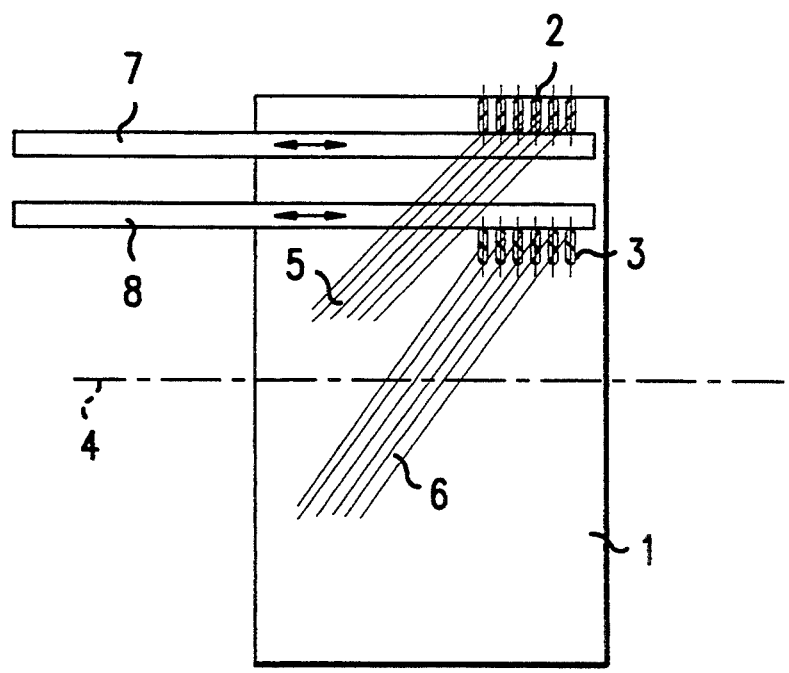
FIG. 1 shows a winding drum and two fiber guide devices in a top view.
Figure 2:
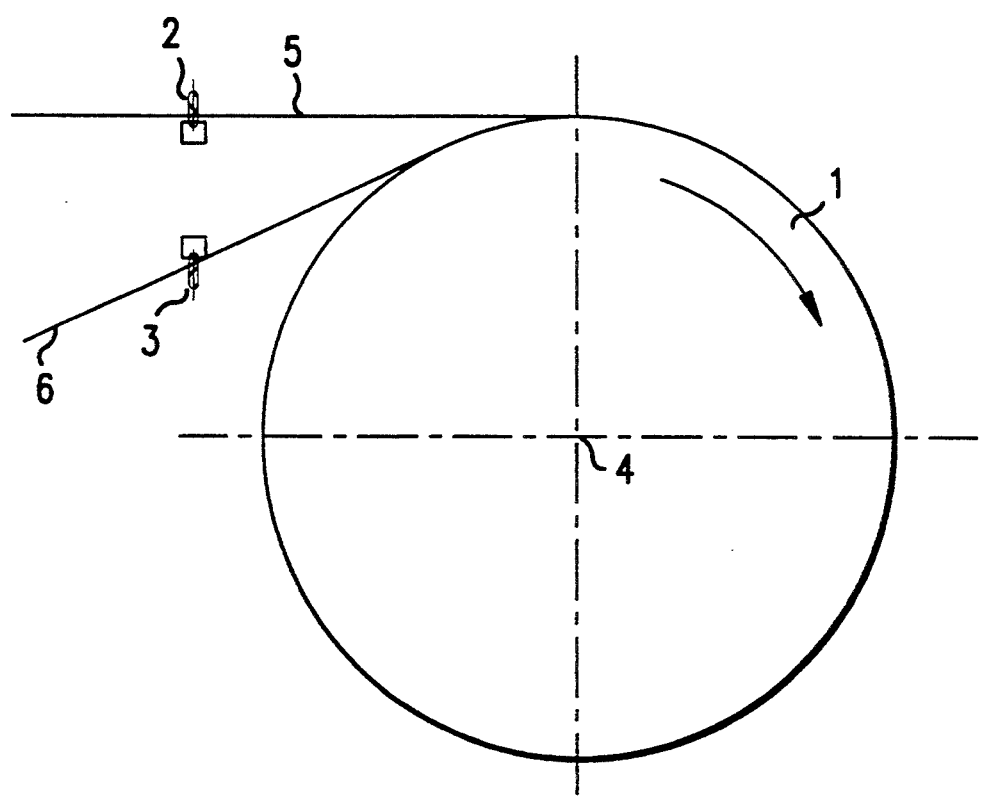
FIG. 2 shows the winding drum and the fiber guide devices according to FIG. 1 in a side view.

In FIG. 1 the winding drum surface is shown in a top view and in FIG. 2 a winding drum end is shown in a side view: Round drum 1 rotating around rotational axis 4, reciprocating comb-shaped fiber guide device 2 for hollow fibers 5, which is permanently attached to reciprocating rod 7, as well as reciprocating fiber guide device 3 for fibers 6, which is permanently attached to reciprocating rod 8. Fiber guide device 2 feeds five hollow fibers 5, and fiber guide device 3 feeds five fibers 6, to round winding drum 1. The drive devices for rods 7 and 8 and hence for fiber guide devices 2 and 3 are not shown. Likewise not shown is the drive device for drum 1. Fiber guide device 3 for fibers 6 here is moved back and forth at a higher speed than fiber guide device 2 for hollow fibers 5.

Figure 3:
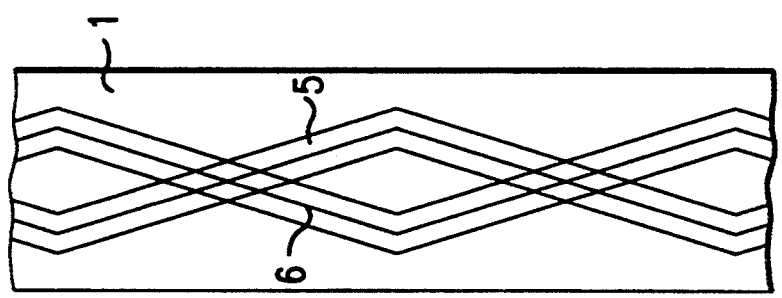
FIG. 3 shows a hollow fiber layer and a fiber layer on a winding drum in a top view.

FIG. 3 shows a surface segment of a winding drum 1, on which the first hollow fiber layer consisting of three hollow fibers 5 and the first fiber layer consisting of three fibers 6 have been wound. Hollow fibers 5 and fibers 6 are wound zig-zag fashion on winding drum 1, with the wavelength and wave amplitude of both layers being the same, but hollow fiber layer 5 is arranged phase-shifted with respect to fiber layer 6. This is accomplished by the fiber guide device, not shown, for hollow fibers 5 being moved back and forth in the respectively opposite (contrary) direction from the fiber guide device for fibers 6, likewise not shown. Therefore, when one fiber guide device moves from left to right, the other fiber guide device moves from right to left and vice versa, and both fiber guide devices reach their reversing points, at which they reverse their direction of motion, at the same time.

Figure 4:
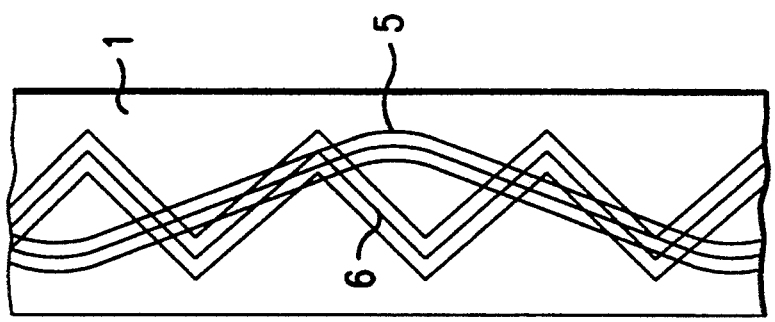
FIG. 4 shows another embodiment of a hollow fiber layer and a fiber layer on a winding drum.

FIG. 4 shows an embodiment in which hollow fiber layers 5 have a much longer wavelength than fiber layers 6. The wave amplitudes on the other hand are the same in both. Such an embodiment is achieved by the fiber guide device for fibers 6 being moved back and forth at a higher speed than the fiber guide device for hollow fibers 5. With this mode of operation, the two fiber guide devices alternately move in the same direction and then in opposite directions, but the fiber guide device for fibers 6 always moves with a higher speed than the fiber guide device for hollow fibers 5.

Figure 5:
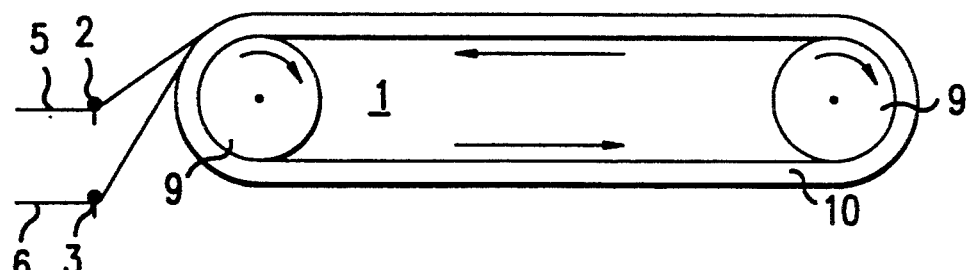
FIGS. 5 and 6 show embodiments of the winding drum.
Figure 6:
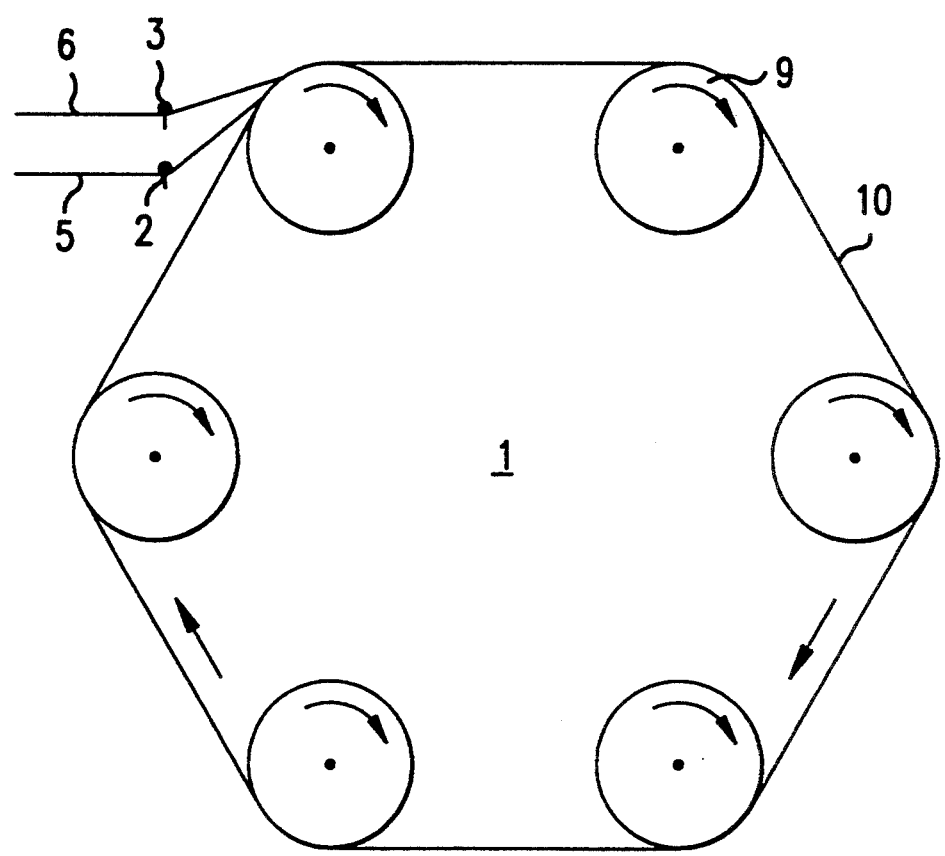

In FIG. 5, one of the two rollers 9 and the strip or belt 10 is shown and in FIG. 6, a rotating drum 1 formed by the six rollers 9 and the strip or belt 10 is shown simplified in a side view. Rollers 9 are fixed, but rotatable around their lengthwise axes. At least one of rollers 9 is driven by a device, not shown, for example an electric motor. The non-driven roller(s) 9 is/are set rotating (in the direction of the arrow) by circulating strip (belt) 10 (see the arrow). The position of fiber guide devices 2 and 3 for hollow fibers 5 and fibers 6 respectively is likewise shown.

In this manner, a rotating drum can also be composed of three, four, five, seven, eight, etc. rollers 9 and a strip or belt 10. Similarly, several narrow strips or belts 10 can be arranged side by side over longer common rollers 9 to form rotating drums, for winding up a plurality of hollow fiber strands (laps) in succession or simultaneously, side by side.

It is preferable in the present invention that the hollow fibers run mainly in the lengthwise direction of the hollow fiber bundle, and accordingly the circumferential length of the lap (strand) formed on the rotating drum is much greater than its width. This likewise applies to the surface required for the lap (strand) on the rotating drum. The drum itself can also be relatively narrow relative to its diameter or to a comparable dimension, when it is provided for winding up only one lap (strand).

The rotating drum is therefore not comparable with an ordinary sleeve-shaped bobbin or the like.

Figure 7:
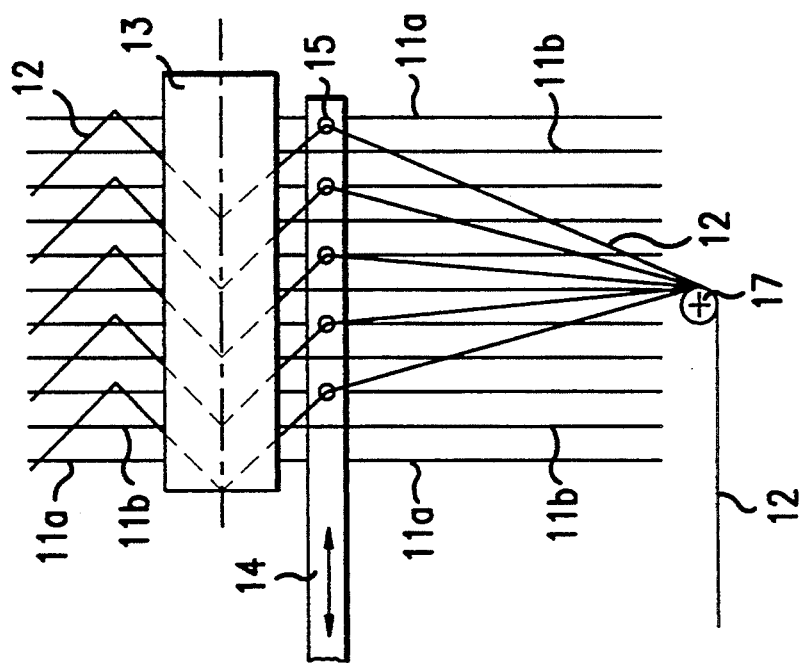
FIG. 7 is a top view of hollow fiber and fiber sheets as well as parts of a device for working the method.

FIG. 7 shows the following: Six hollow fibers 11a, five hollow fibers 11b, fibers 12, common reversing device (a rotatable roller) 13, reciprocating (traversing) fiber guide device 14 with fiber guide eyes 15, as well as a reversing device (a rotatable roller) 17 for fibers 12. Hollow fibers 11a form a sheet and hollow fibers 11b also form a sheet, said sheets being staggered slightly laterally with respect to one another, so that hollow fibers 11a run over the gaps between hollow fibers 11b and vice versa. Both sheets are fed from different directions to common reversing device 13 (see FIG. 8). In the hollow fiber shed thus formed, fiber guide device 14 moves back and forth. This can be seen from the fact that hollow fibers 11a in the drawing run behind fiber guide device 14 and hollow fibers 11b run in front of fiber guide device 14. Fibers 12 are initially guided over reversing device 17 and then through eyes 15 and, immediately before hollow fibers 11a and hollow fibers 11b touch common reversing device 13, are inserted in undulating form (zig-zag) between the two hollow fiber sheets by the reciprocating movement of fiber guide device 14. After leaving common reversing device 13, and hence above the latter in the drawing, hollow fibers 11a, fibers 12, and hollow fibers 11b form a sandwich-type hollow fiber bundle composed of a hollow fiber layer with hollow fibers 11a, a fiber layer with fibers 12, and a hollow fiber layer with hollow fibers 11b. As is also evident, each fiber 12 crosses several, but not all, hollow fibers 11a, 11b.

Figure 8:
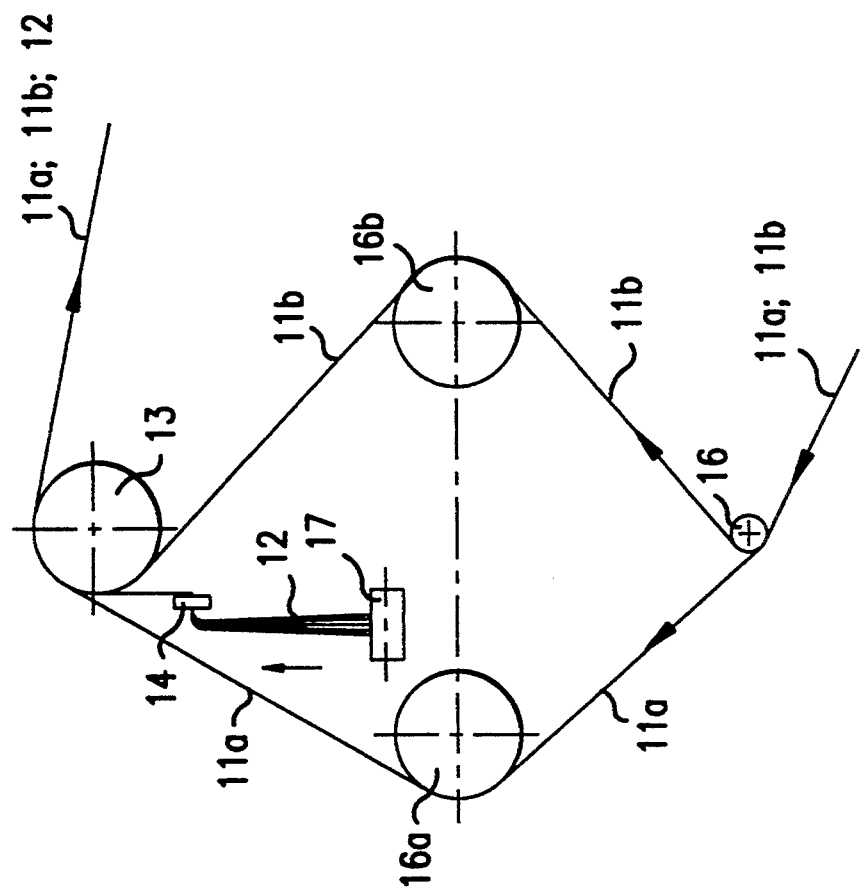
FIG. 8 is a side view of hollow fiber and fiber sheets as well as a device for working the method.

In FIG. 8 the parts according to FIG. 7 and reversing devices 16, 16a, and 16b for hollow fibers 11a, 11b are shown in a side view. The description of FIG. 7 also applies to FIG. 8. In addition, FIG. 8 shows how the hollow fiber sheet composed of hollow fibers 11a and 11b is initially guided over reversing device 16 and then fanned out into two hollow fiber sheets, while hollow fibers 11a are guided over reversing device 16a and hollow fibers 11b are guided over reversing device 16b before they are fed to common reversing device 13. Also clearly evident is the resultant hollow fiber shed in which fiber guide device 14 moves back and forth, in other words perpendicular to the plane of the figure in the drawing. FIG. 8 also shows that the hollow fiber sheets are each formed by hollow fibers 11a and 11b moved forward in a common plane and guided at different angles, in other words from different directions, to common reversing device 13 and hence toward one another.

Figure 9:
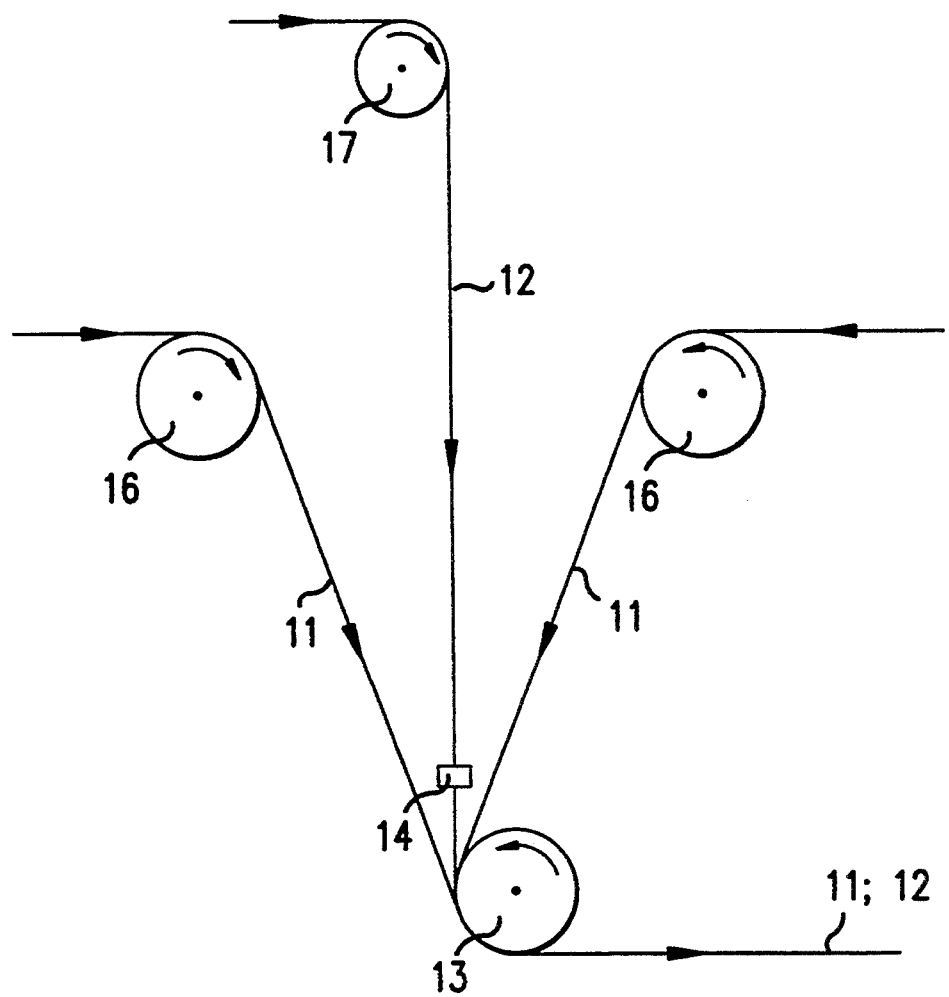
FIG. 9 is a side view of another embodiment of the method.

FIG. 9 shows the manufacture of a hollow fiber bundle from two hollow fiber sheets which are not formed by fanning a hollow fiber sheet. Both hollow fiber sheets are formed by the hollow fibers 11 moved forward parallel and side by side in a common plane, and each hollow fiber sheet is fed around an individual reversing device 16 of the common reversing device 13, with the two reversing devices 16 being so arranged that the two hollow fiber sheets run at different angles, in other words from different directions, onto common reversing device 13, in other words toward one another. In the hollow fiber shed thus formed, fiber guide device 14 moves back and forth, perpendicular to the plane of the figure in the drawing, so that fibers 12 that were previously guided over reversing device 17 are laid down in undulating fashion or in zig-zag fashion between the two hollow fiber sheets, immediately before hollow fibers 11 and fibers 12 are jointly reversed by reversing device 13. Otherwise the corresponding parts of the description of FIGS. 7 and 8 apply to FIG. 9 to the extent that they are not contradictory.

What is claimed is:

1. Hollow fiber bundle of hollow first fibers arranged in layers on top of one another and layers of second fibers arranged between the hollow first fiber layers, and from a top view of the hollow fiber bundle, the hollow first fibers are made undulating or essentially rectilinear and the second fibers are made undulating and the second fibers are so arranged that hollow first fibers and second fibers intersect at several locations and are laid one on top of the other, and are not woven, knit, or otherwise joined.

2. Hollow fiber bundle according to claim 1 with said hollow first fibers made undulating, in which at least the successive hollow first fiber layers in a lengthwise direction of the hollow fiber bundle are arranged staggered with respect to one another.

3. Hollow fiber bundle according to claim 2 in which a wavelength of said hollow first fibers is greater than a wavelength of said second fibers.

4. Hollow fiber bundle according to claim 2 in which a layer of second fibers is placed between each hollow first fiber layer.

5. Hollow fiber bundle according to claim 1 with said hollow first fibers formed essentially rectilinearly, in which successive hollow first fiber layers are arranged slightly offset laterally with respect to one another.

6. Hollow fiber bundle according to claim 1 in the form of a component of at least one member selected from the group consisting of material and heat exchangers.

7. Method for manufacturing the hollow fiber bundle with undulating hollow first fibers according to claim 1 in which at least one hollow first fiber and at least one second fiber are wound simultaneously on a rotating drum to form at least one lap, in which the at least one hollow first fiber is guided over one first reciprocating fiber guide device and the at least one second fiber is guided over at least one second reciprocating fiber guide device before winding on said drum, with either the at least one first fiber guide device being moved back and forth in the respectively opposite direction from the at least one second fiber guide device, or the at least one second fiber guide device being moved back and forth at a higher speed than the at least one first fiber guide device, with winding being terminated after winding of the desired quantity of hollow first fibers and with the lap formed on said drum, whose circumferential length is considerably larger than its width, being cut before or after removal from said drum at at least one point that is essentially transverse to the lengthwise direction of the hollow first fibers.

8. Device for the method according to claim 7 comprising a rotating drum for simultaneous winding of at least one hollow first fiber and at least one second fiber and of at least one first reciprocating fiber guide device to feed the at least one hollow first fibers onto said drum and of at least one second reciprocating fiber guide device to feed the at least one second fiber onto said drum, with either the at least one first fiber guide device for the at least one hollow first fiber being moved back and forth in the respectively opposite direction from the at least one second fiber guide device for the at least one second fiber, or the at least one second fiber guide device for the second fiber being moved back and forth at a higher speed than the at least one first fiber guide device for the at least one hollow first fiber, and with the device optionally having a device for cutting the lap.

9. Method for manufacturing a hollow fiber bundle with undulating hollow first fibers according to claim 1, in which at least one hollow first fiber and at least one second fiber are laid down simultaneously on a rotating drum in a short space of time, covering a portion of the circumference of said drum, with the at least one hollow first fiber being passed over a first reciprocating fiber guide device and the at least one second fiber being passed over a second reciprocating fiber guide device prior to being laid on said drum, and with either the first fiber guide device being moved back and forth in the respectively opposite direction from the second fiber guide device, or the second fiber guide device being moved back and forth at a higher speed than the first fiber guide device, and with said at least one hollow first fiber and said at least one second fiber being taken by a second rotating drum immediately thereafter, retaining the arrangement and undulating formation of hollow first fibers and second fibers, and then being wound, with winding being terminated after winding the desired amount of hollow first fibers, and with the lap formed on the second drum being cut at at least one point essentially transversely to the lengthwise direction of hollow first fibers, before or after removal from the second drum.

10. A device for the method according to claim 9 comprising a first rotating drum for simultaneously laying down at least one hollow first fiber and at least one second fiber and at least one first reciprocating fiber guide device for feeding the at least one hollow first fiber onto said first drum and of at least one second reciprocating fiber guide device for feeding the at least one second fiber onto said first drum, with either said first fiber guide device for the at least one hollow first fiber being moved back and forth in the respectively opposite direction from said second fiber guide device for the at least one second fiber, or said second fiber guide device for the at least one second fiber being moved back and forth at a higher speed than said first fiber guide device for the at least one hollow first fiber, and a second rotating drum located downstream from said first drum to receive and wind up hollow first fibers and second fibers laid down on said first drum, and with the second drum optionally having a device for cutting the lap.

11. Method for manufacturing a hollow fiber bundle with essentially rectilinearly arranged hollow fibers according to claim 1 in which at least two hollow first fiber sheets of hollow first fibers are moved forward, toward and parallel to one another in a common plane in the hollow first fiber lengthwise direction, at different angles, staggered slightly with respect to one another laterally, to a common reversing device, with at least one second fiber being inserted in the hollow fiber shed formed by a reciprocating fiber guide device immediately before hollow first fibers run onto the reversing device, in such fashion that each hollow first fiber is intersected repeatedly by at least one second fiber at intervals.

12. Method according to claim 11 in which the hollow fiber sheets are formed by fanning out at least one hollow first fiber sheet, before insertion of the second fiber that has exactly the same number of hollow first fibers as all of the hollow fiber sheets formed therefrom, combined.

13. A device for working the method according to claim 11 comprising at least one rod-shaped reversing device for reversing the hollow fiber bundle after laying of said at least one second fiber, two rod-shaped first guide devices for guiding two hollow first fiber sheets, so arranged that the hollow fiber sheets are fed at different angles to said reversing device, so that the hollow fiber sheets form a hollow fiber shed in front of said reversing device, a reciprocating fiber guide device movable back and forth in the hollow fiber shed for undulating, zig-zag, or similar laying of at least one second fiber between the hollow first fiber sheets, and a second guide device for feeding at least one second fiber to said reciprocating fiber guide device.

14. A device according to claim 13 in which as many rod-shaped first guide devices are provided for the hollow fiber sheets and so arranged that they produce a fanning out of a hollow fiber sheet into two or more hollow fiber sheets.

15. Method according to claim 11 in which said intervals are regular intervals.

16. A device according to claim 13, wherein said reversing device is a rotatable or driven roller.

17. A device according to claim 13, wherein said rod-shaped first guide devices are rotatable or driven rollers.

18. Hollow fiber bundle according to claim 1, wherein said second fibers are selected from the group consisting of multifilament fibers and monofils.

19. Hollow fiber bundle according to claim 1, wherein said second fibers are textured fibers.

* * * * *

UNITED STATES PATENT AND TRADEMARK OFFICE
CERTIFICATE OF CORRECTION

PATENT NO. : 5,450,516
DATED : Sep. 12, 1995
INVENTOR(S) : Pasquali et al.

It is certified that error appears in the above-indentified patent and that said Letters Patent is hereby corrected as shown below:

Column 4, line 24, after "example" insert --,--.

Column 9, line 60, before "sheet" insert --hollow fiber--; and

, line 61, before "sheet" insert --hollow fiber--.

Signed and Sealed this

Fifth Day of December, 1995

Attest:

Attesting Officer

BRUCE LEHMAN

Commissioner of Patents and Trademarks